United States Patent [19]
Ando et al.

[11] Patent Number: 5,243,687
[45] Date of Patent: Sep. 7, 1993

[54] FUZZY COMPUTER SYSTEM HAVING A FUZZY INFERENCE PROCESSING CIRCUIT FOR CONTROLLING AND ADAPTING OUTPUT SIGNAL TO THE SET MEMBERSHIP SIGNAL

[75] Inventors: Tanichi Ando, Kyoto; Kazuaki Urasaki, Mukou, both of Japan

[73] Assignee: Omron Tateisi Electronics Co., Kyoto, Japan

[21] Appl. No.: 406,961

[22] Filed: Sep. 13, 1989

[30] Foreign Application Priority Data

Sep. 20, 1988 [JP] Japan .................. 63-233579
Sep. 30, 1988 [JP] Japan .................. 63-247777

[51] Int. Cl.$^5$ .................. G05B 11/01; G06F 15/16
[52] U.S. Cl. .................. 395/3; 395/900; 364/DIG. 1; 364/274.6; 364/274.7
[58] Field of Search .................. 395/3, 900

[56] References Cited

U.S. PATENT DOCUMENTS

| | | | |
|---|---|---|---|
| 3,794,981 | 2/1974 | O'Connor | 395/800 |
| 4,332,014 | 5/1982 | Nakazawa et al. | 395/425 |
| 4,837,725 | 6/1989 | Yamakawa | 395/3 |
| 4,875,044 | 10/1989 | Ohta et al. | 341/87 |
| 4,875,184 | 10/1989 | Yamakawa | 364/807 |
| 4,914,924 | 4/1990 | Takahashi | 62/133 |
| 5,012,430 | 4/1991 | Sakurai | 364/513 |

FOREIGN PATENT DOCUMENTS

0268182A2  5/1988  European Pat. Off. .
89117422   6/1992  European Pat. Off. .
63-113736  5/1988  Japan .

OTHER PUBLICATIONS

Yamazaki et al. "A microprocessor based fuzzy controller for industrial purpose"; Elsevier Science Publishers B.V. (North Holland); 1985; pp. 231–239.
"Expert System on a Chip: An Engine for Real-Time Approximate Reasoning," M. Togai et al., I.E.E.E. Expert, Fall 1986, pp. 55–62.
"Fuzzy Logic," L. Zadeh, I.E.E.E. Expert, Apr., 1988, pp. 83–93.

*Primary Examiner*—Parshotam S. Lall
*Assistant Examiner*—Krisna Lim
*Attorney, Agent, or Firm*—Dickstein, Shapiro & Morin

[57] ABSTRACT

A fuzzy computer system has: a digital processor; a digital memory; a fuzzy inference processing circuit; and an interface for the fuzzy inference processing circuit. The digital memory stores programs executed by the digital processor and inference rules used by the fuzzy inference processing circuit. The fuzzy inference processing circuit executes a fuzzy inference on the basis of a given inference rule. The interface connects the digital processor and the fuzzy inference processing circuit through a bus. The digital processor gives the inference rules stored in the digital memory to the fuzzy inference processing circuit through the interface and fetches the result of the inference of the fuzzy inference processing circuit through the interface.

5 Claims, 6 Drawing Sheets

FUZZY COMPUTER SYSTEM HAVING A FUZZY INFERENCE PROCESSING CIRCUIT FOR CONTROLLING AND ADAPTING OUTPUT SIGNAL TO THE SET MEMBERSHIP SIGNAL

BACKGROUND OF THE INVENTION

1. Field of the Invention

The present invention relates to a fuzzy inference processing apparatus and a computer system to execute a fuzzy inference process.

2. Description of the Related Art

Computers are used in every field of society due to the progress of the computer techniques and the realization of low priced hardware.

However, conventional computers have a problem such that an object to be handled by the system is strictly modeled and the operation of the program must be described in detail in conformity with the model. Therefore, it is extremely difficult to form the program for handling an object which cannot be strictly modeled. This is because in the conventional computers, programs are formed fundamentally on the basis of the operation to process binary data which is expressed by 1 and 0. In the conventional computers, when programs are formed, it is necessary to strictly describe an object by numerical expressions in order to execute condition discrimination.

In recent years, devices called a fuzzy computer, a fuzzy controller, a fuzzy inference apparatus, and the like, which execute inferences based on the fuzzy theory, have been developed (for instance, "NIKKEI ELECTRONICS", No. 426, pages 129-152, July 27, 1987). The fuzzy inference devices include those having a special architecture irrespective of the analog or digital type and those using the conventional digital computer. A circuit construction of having a special architecture only for executing a fuzzy inference is complicated. On the other hand, the devices using the digital computer needs a memory to store data indicative of a membership function. The memory must have a fairly large capacity.

SUMMARY OF THE INVENTION

The present invention is made by paying attention to the problems of such conventional computers and it is an object of the invention to realize a fuzzy computer system in which an object which cannot be strictly modeled and has a vague portion can be handled by using the fuzzy theory.

Another object of the invention is to provide a fuzzy inference processing apparatus in which a part of the fuzzy inference (the antecedent process of the fuzzy inference rule) can be executed at a high speed by a simple construction.

The fuzzy computer system according to the invention comprises a digital processor, a digital memory, a fuzzy inference processing circuit, and a fuzzy inference processing circuit interface. The digital memory stores the program of the digital processor and the inference rules of the fuzzy inference processing circuit. The fuzzy inference processing circuit executes the fuzzy inference on the basis of a given inference rule. The fuzzy inference processing circuit interface connects the digital processor and the fuzzy inference processing circuit. In accordance with the program stored in the digital memory, the digital processor gives the inference rules stored in the digital memory to the fuzzy inference processing circuit via the interface and fetches the result of the inference of the fuzzy inference processing circuit through the interface.

Since the system according to the invention has features of both the conventional digital computer and the feature of the fuzzy inference processing circuit, it can be applied to wider fields.

Since the system of the invention has the fuzzy inference processing circuit, an object having a vague portion which was difficult to be handled by the conventional digital computer can be easily handled. Many of the objects which are needed to be handled by the computers can hardly be strictly modeled and include vague portions. Therefore, the areas which can be used by the computers can be remarkably enlarged according to the invention. Further, since the fuzzy theory can use vague expressions, the computer can be operated by a smaller amount of descriptions than the program of the conventional computer and the program can be more easily formed and maintained. On the other hand, in the invention, since the strict expression is unnecessary, the user who does not have the detailed knowledge regarding the system and an object can easily form or change the description of the fuzzy rule, so that a number of persons larger than that in the case of the conventional computer can use the system.

According to the invention, since the fuzzy inference process is realized by the special hardware system, the fuzzy inference process can be executed at a higher speed than when it is realized by the program of the digital computer.

According to the invention, the system has the digital processor to execute a program similar to that of the conventional computer, so that all of the programs which could be realized by the conventional computer can be realized. The numerical value arithmetic operation, sequence process, control of external input and output, recording of digital data, man/machine interface, etc. which are difficult to be handled by the fuzzy theory can be also easily executed That is, the following processes can be performed.

(1) A Plurality of Sets of Fuzzy Inferences

A plurality of sets of fuzzy inferences can be executed by changing the setting of the rules or the like.

(2) Control of Sequence

The synchronization with external phenomena, control of the timing, and operations having an order can be executed.

(3) Process of Input Information

The information from sensors, a terminal apparatus, other computer systems, and the like which are connected to the outside can be processed by a CPU and can be converted into the format which can be handled by the fuzzy inference processing circuit.

(4) Process of Output Information

The information which was output from the fuzzy inference processing circuit can be processed by the CPU and can be converted into the format which can be connected to an actuator, terminal apparatuses, other computer systems, and the like which are connected to the outside, and the information of such a format can be output.

(5) Setting of Membership Function

The membership function can be set or changed from the CPU.

(6) Setting of Inference Rules

The inference rules of the fuzzy inference can be set or changed from the CPU.

(7) Control of External Input and Output

Separately from the input and output of the fuzzy inference processing circuit, signals and data can be input and output to/from the outside. Thus, the operation of the system can be controlled from the outside and signals can be output to the external apparatus.

(8) Recording of Information

The input/output information of the fuzzy inference processing circuit, inference rules of the fuzzy inference, membership functions, and the like can be stored and used.

(9) Man/Machine Interface

The user can control the system from the outside by executing the operation of the system, the setting and changing of the inference rules and membership function, and the like.

A detailed explanation will now be made hereinbelow with respect to an embodiment using a circuit which has already been proposed as a fuzzy inference processing circuit by the applicant of the present invention, that is, a circuit in which a membership function is expressed by voltage signals distributed on a plurality of (for instance, 25) lines and the fuzzy inference is executed by directly using the signals distributed on the plurality of lines (for example, refer to JP-A-63-123177 or U.S. patent application Ser. No. 116,777 or European Patent Application No. 87 116 529.6). However, various kinds of hardware systems such as a special circuit to handle a digital signal and the like can be obviously applied as a fuzzy inference processing circuit in the invention.

An antecedent processing apparatus in a fuzzy inference processing apparatus according to the invention is characterized by comprising: a gate control unit for comparing predetermined bits of an input signal which is expressed by a binary signal of a plurality of bits with a code indicative of a set membership function and for outputting a gate control signal when the input signal lies within a range which is covered by the membership function; and a adaptation output unit for outputting a signal indicative of an adaptation of the input signal to the set membership function by using the bits other than the predetermined bits when the gate control signal is given and for outputting a signal indicative of zero when the gate control signal is not given.

According to the invention, discrimination with respect to whether the input signal lies within a range which is covered by the set membership function or not is executed by using predetermined bits among a plurality of bits which construct the input signal, data indicative of the adaptation is made by using the other bits of the input signal in accordance with the result of the discrimination, and this data is output or data indicative of zero is output. Therefore, the process for the antecedent part of the fuzzy rules can be accomplished at a high speed by an extremely simple construction without needing any complicated arithmetic operations and a memory of a large capacity.

DETAILED DESCRIPTION OF A PREFERRED EMBODIMENT

Figure 1:
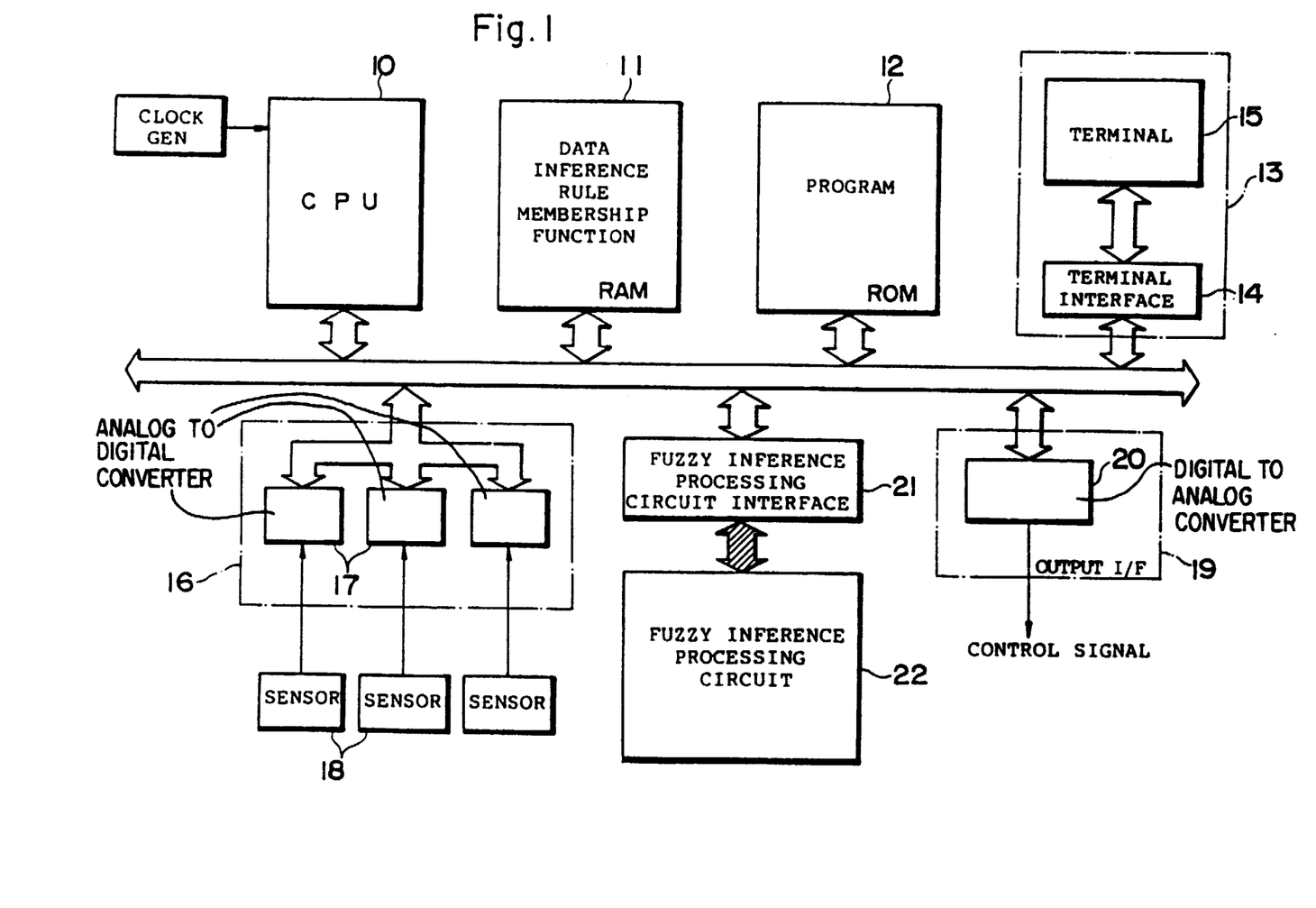
FIG. 1 is a block diagram showing a construction of a fuzzy computer system.

FIG. 1 shows a construction of a fuzzy computer system according to the invention.

The fuzzy computer system comprises: a CPU 10; digital memories; a fuzzy inference processing circuit 22; a fuzzy inference processing circuit interface 21; a terminal unit 13 for controlling the operation of the system from the outside; an input unit 16 for inputting data to the fuzzy inference processing circuit; and an output unit 19 for using the result of the process of the fuzzy inference processing circuit. The above components are connected by a bus.

A RAM 11 and a ROM 12 are used as digital memories. The RAM 11 stores various data, and inference rules, membership functions, and the like for the fuzzy inference processing circuit 22. The ROM 12 stores a program which is executed by the CPU 10.

The CPU 10 controls the whole system and, in particular, controls the data input/output and the fuzzy inference processing circuit 22 in accordance with the program stored in the ROM 12.

The fuzzy inference processing circuit 22 executes the operation of the fuzzy inference. The fuzzy inference processing circuit interface 21 connects the CPU 10 and the fuzzy inference processing circuit 22. Construction of the interface 21 and processing circuit 22 will be described in detail below.

A terminal apparatus 15 and a terminal apparatus interface 14 to use the terminal apparatus 15 are provided as means 13 for controlling the operation of the system from the outside. The terminal apparatus 15 has a CRT display and a keyboard. The terminal apparatus 15 is used to operate the system, to set and change the rule and membership function, to display data, and the like.

The input unit 16 for inputting data from the outside is a fuzzy input interface to input signals from, for instance, external sensors 18 or the like and includes, for example, three A/D (analog-to-digital) converters 17. The CPU 10 fetches data from the sensors 18 or the like which are connected to the outside and controls in a manner such that the input data is converted into the digital signals by the A/D converters 17 and is, further, converted into the fuzzy data and, thereafter, the fuzzy data can be given to the fuzzy inference processing circuit interface 21.

The output unit 19 for using the result of the process of the fuzzy inference processing circuit 22 includes a fuzzy output interface to output a control signal to the outside. In the embodiment, the fuzzy output interface is constructed by a D/A (analog-to-digital) converter 20 and outputs an analog control signal to the outside.

In FIG. 1, although the means 13 for controlling the operation of the system from the outside is connected to the CPU 10 through the bus, the input unit 13 can be also realized by other systems such as a power switching circuit or the like.

In FIG. 1, the output unit 16 for inputting data to the fuzzy inference processing circuit 22 and the output unit 19 for using the result of the process of the fuzzy inference processing circuit 22 are connected to the CPU 10 via the bus. However, the units 16 and 19 can be also directly connected to the fuzzy inference processing circuit 22 or the data can be input and output to and from the units 16 and 19 through the terminal apparatus 15.

Figure 2:
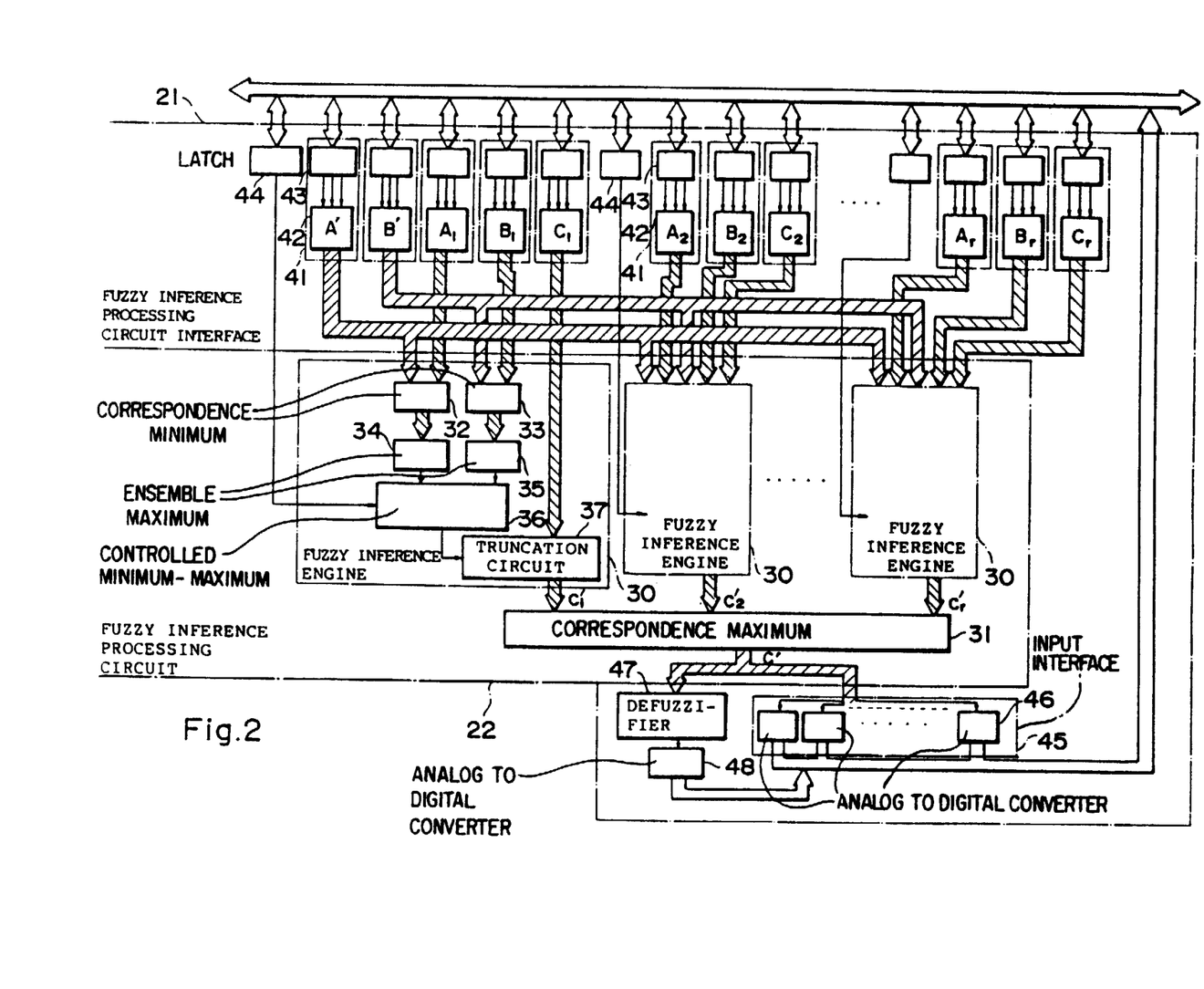
FIG. 2 is a block diagram showing a practical example of a fuzzy inference processing circuit and its interface.

FIG. 2 shows an example of constructions of the interface 21 and fuzzy inference processing circuit 22. In the diagram, binary buses are shown as blank arrow lines and a plurality of (for instance, 25) lines to transmit a voltage signal distribution indicative of the membership function are shown as hatched arrow lines.

The fuzzy inference processing circuit 22 can execute the inferences using r fuzzy inference rules (called modus ponens, if-then rules). For this purpose, r fuzzy inference engines 30 are provided. The inference engines 30 have an architecture which is applied to a rule having two fuzzy proposition in the antecedent part of the implication. Fuzzy sets (or membership functions) in the antecedent part of the implication are expressed by $A_i$ and $B_i$ (i=1 to r) and a fuzzy set (or membership function) in the consequent part of the implication is expressed by $C_i$ (i=1 to r). On the other hand, fuzzy sets (or membership functions) of the premise are expressed by A' and B'. Each inference engine 30 comprises: a C-MIN circuit (correspondence MIN circuit) 32 which receives A' and $A_i$; a C-MIN circuit 33 which receives B' and $B_i$; an E-MAX circuit (ensemble MAX circuit) 34 which receives an output of the C-MIN circuit 32; an E-MAX circuit 35 which receives an output of the C-MIN circuit 33; a controlled MIN-MAX circuit 36 which receives outputs of the E-MAX circuits 34 and 35; and a truncation circuit 37 which receives an output of the circuit 36 as a truncating input and cuts out (MIN operation) the $C_i$ by the truncating input. An output of the truncation circuit 37 expresses one inference result $C_i'$. The controlled MIN-MAX circuit 36 executes the MIN operation or MAX operation in accordance with a control input. Outputs of all of the inference engines 30 are added by the C-MAX circuit 31, so that a final inference result C' is obtained.

On the basis of the data which is given from the CPU 10, the fuzzy inference processing circuit interface 21 gives the membership functions A', B', $A_i$, $B_i$, and $C_i$ and a control signal of the controlled MIN-MAX circuit 36 to the inference engines 30. The interface 21 also allows the CPU 10 to fetch the inference result C' of the fuzzy inference processing circuit 22. The interface 21 includes membership function output interfaces 41. The interface 41 is a membership function generator (hereinafter, referred to as an MFG). The MFG 41 comprises a latch circuit 43 and a voltage distribution generator 42. The MFGs 41 are provided for all of the above membership functions A', B', $A_i$, $B_i$, and $C_i$. Codes (labels) indicative of the membership functions are given from the CPU 10 to the latch circuit 43 via the bus. A voltage distribution indicative of the membership function corresponding to the code given to the latch circuit 43 is generated from the voltage distribution generator 42 and is input to the corresponding inference engine 30. The interface 21 also has latch circuits 44 to temporarily store the codes indicative of the control signals of the controlled MIN-MAX circuit 36. The codes are also given from the CPU 10.

The interface 21 further has an inference result input interface 45 to give the inference result C' which is obtained from the fuzzy inference processing circuit 22 to the CPU 10. The interface 45 includes A/D converters 46 which are respectively connected to the lines to output the voltage distributions indicative of the inference results C'. Voltages of the lines are converted into the digital signals and are sequentially input to the CPU 10 via the buses.

The interface 21 further includes a defuzzifier 47 to convert the inference result C' into the deterministic values and an A/D converter 48 to convert an analog output of the defuzzifier 47 into a digital signal. An output of the A/D converter 48 is input to the CPU 10 via the bus.

When the CPU 10 writes data (codes) into all of the membership function output interfaces 41 and the latch circuits 44 as MIN-MAX circuit control interfaces, the fuzzy inference processing circuit 22 executes the fuzzy inference process and outputs the result of the process. The result of the process which was output from the fuzzy inference processing circuit 22 is read by the CPU 10 via the interface 45 or defuzzifier 47, so that the result of the process can be used.

As mentioned above, the CPU 10 can execute one fuzzy inference by the single writing operation into the latch circuits 43 and 44 of the interface 21 in accordance with the program in the ROM 12. By changing the rules the fuzzy inference may be also repetitively executed. The codes may be also written into the interface on the basis of the inference result.

In the embodiment, the user can also control the system by operating the terminal apparatus 15. For instance, the setting of the rule, starting of the inference, and stopping of the inference can be also executed from the terminal apparatus 15. For example, the commands corresponding to the setting of the rule, starting of the inference, and stopping of the inference are set to SET, RUN, and STOP, respectively. The SET command is input by "SET rule code". When the SET command is input, the CPU 10 sets the corresponding rule in the RAM 11 into the interface 21. When the RUN command is input, the CPU 10 allows the fuzzy inference to be executed. The format to execute the fuzzy inference differs depending on an object to be handled by the system. For instance, in the application to the control, the CPU 10 repetitively executes the fuzzy inference on the basis of the input data from the sensors 18 and controls the apparatuses connected to the outside.

If the user inputs the STOP command from the terminal apparatus 15 during the execution of the fuzzy inference, the CPU 10 stops the fuzzy inference and is returned to the input waiting mode.

In the embodiment, the signals of the sensors 18 or the like can be input via the three A/D converters 17.

The CPU 10 converts the non-fuzzy values such as data which were input from the A/D converters 17 into the membership functions and stores into the RAM 11 or sets into the interface 21 for the fuzzy inference.

Modifications will now be summarized hereinbelow.

(1) Medium For Storing the Program

In the above-described embodiment, the program has been stored into the P-ROM. However, a realizing system such as to store the program into an RAM is also possible. The program can be also provided in the CPU or can be also read out of an external memory device.

(2) Construction of the Memory

If the necessary memory capacity is small, the memory can be also assembled in the CPU.

(3) Construction of the Fuzzy Inference Processing Circuit

The fuzzy inference processing circuit can be also constructed by a digital circuit.

(4) Fuzzy Inference Processing Circuit Interface

In general, since the same membership function can be used for various objects, it is not always necessary to be rewritten. In this case, the membership function can be also set by a method different from that in the embodiment.

In the embodiment, although the membership function has been generated by the voltage distribution generator, the membership function can be also generated by using the D/A converter or both of the D/A converter and the analog multiplexer.

Further, the fuzzy inference engines having the fixed rule can be also used. On the other hand, if the logic which is used in the antecedent part has already been determined to either AND or OR, there is no need to use the controlled MIN-MAX circuit but it can be constructed by an MIN or MAX circuit. The control input of the controlled MIN-MAX circuit can be also set by a switch or a jumper pin instead of the CPU.

(5) Medium for Controlling the Operation of the System from the Outside

In the embodiment, although the system has been controlled from the outside by using the terminal apparatus, it is also possible to control the system by a signal by using an external I/O interface. Such a system is effective for control of a robot, a machine, or the like.

In place of the terminal apparatus, an I/O apparatus such as keyboard, bit map display, or the like can be also combined.

It is also possible to connect the system to a communication circuit and to control the operation of the system from a distant position.

The interface circuit between the CPU and the outside is not always necessary to control the operation of the system from the outside. For instance, the activation of the system can be controlled by turning on the power source. In this case, the timing to start the operation after activation can be also delayed by the program. Further, in order to synchronize with an external phenomenon such as a time, the system can be also combined with, for example, a timer circuit. On the other hand, the operation of the system can be also controlled by abnormality of the power source or the like.

(6) Unit for Inputting Data to the Fuzzy Inference Processing Circuit

In the above embodiment, data has been input by using the A/D converters and the fuzzy membership functions have been input to the fuzzy inference processing circuit via the fuzzy inference processing circuit interface. However, for instance, the following various inputting systems are considered in addition to the above inputting system.

If the fuzzy inference processing circuit is constructed by a digital circuit, the A/D converters are unnecessary and it is sufficient to connect by, for example, latch circuits. A part of the functions which are realized by the fuzzy inference processing circuit and the program in the embodiment can be realized by external circuits and the constructions of the fuzzy inference processing circuit and the programs can be also modified.

The signals can be also directly input from the external sensors or the like to the fuzzy inference processing circuit by using an interface circuit or the like without using the CPU. It is also possible to construct such the system that that signals are converted into the fuzzy information by the external system and the fuzzy information is directly input to the fuzzy inference processing circuit.

It is also possible to construct the system such that the user inputs the signals from the terminal apparatus or the like and they are converted by the program of the digital CPU and are input. The user can also directly input the fuzzy information from the terminal or the like.

The membership functions which were output by other fuzzy computers can be also input. In such a case, it is not always necessary to directly connect the system to the other fuzzy computers but the data which has once been recorded on a magnetic disk or the like may be also used as will be explained hereinafter.

The data which is derived by being processed by the digital computer by the program can be also input to the fuzzy inference processing circuit.

Data can be also formed by the simulation by the digital computer and input to the fuzzy inference processing circuit. Such a system is effective when the operation of the fuzzy computer is analyzed or the like.

The data which has previously been recorded can be also input to the fuzzy inference processing circuit. For instance, it is also possible to construct in a manner such that the data input from the sensors or the like are once recorded into a memory device such as a magnetic disk or the like, and after the data was read in accordance with the program, it is input to the fuzzy inference processing circuit.

Figure 3:
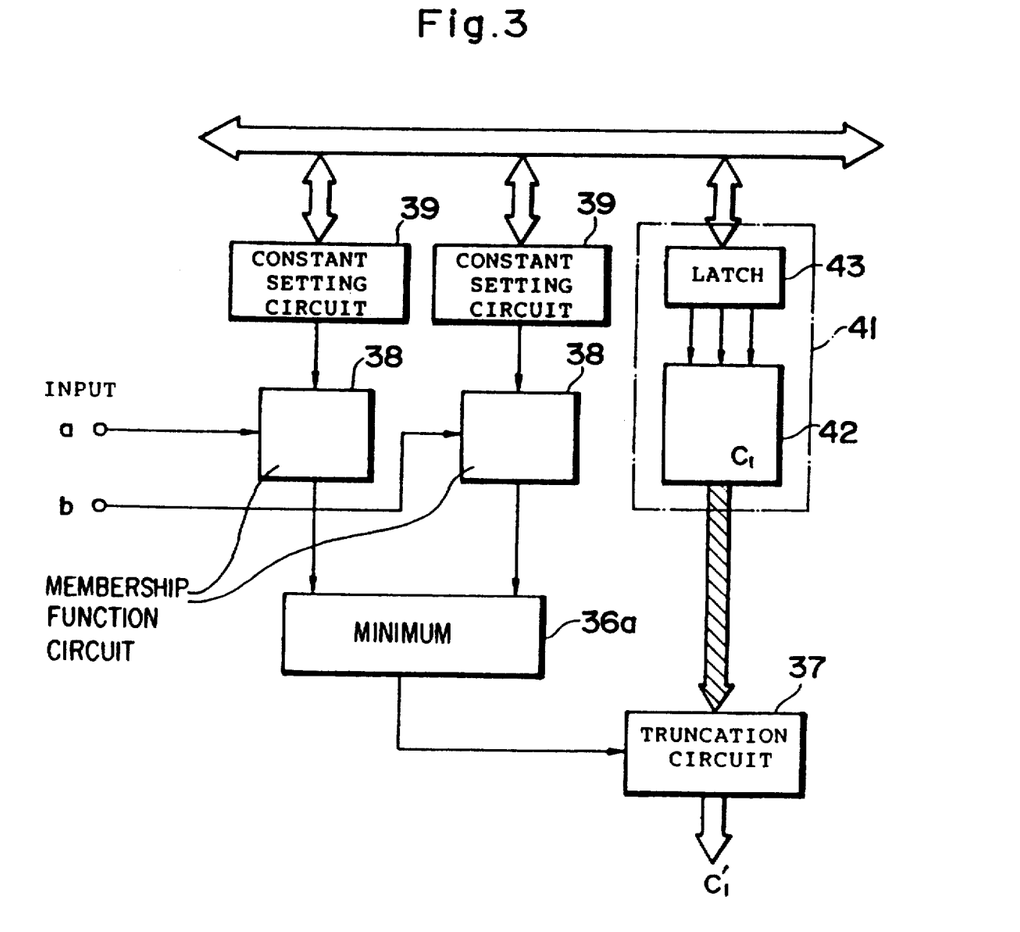
FIG. 3 is a block diagram showing another example of a fuzzy inference processing circuit and its interface.

If the input data is deterministic values which are obtained from the sensors or the like, it is not always necessary to execute the fuzzy operation in the antecedent part by the format of the membership function as in the above embodiment. FIG. 3 shows a part of examples of the interface 21 and the fuzzy inference processing circuit 22 in the case where deterministic values are input. For inputs a and b from the sensors or the like, membership function circuits (MFCs) 38 to output the signals indicative of the membership function value corresponding to the inputs a and b are provided, respectively. Constants (peak position and the like) to specify the membership functions of the MFCs are given from the CPU 10 to constant setting circuits 39 via the buses and are, further, input to the MFCs 38 in the formats suitable for the MFCs 38. Outputs of the two MFCs 38 are given as a truncating input of the truncation circuit 37 through an MIN circuit 36$a$.

(7) Means of Using the Result of the Process of the Fuzzy Inference Processing Circuit In the embodiment, the output membership function of the fuzzy inference processing unit has been input through the A/D converters to the CPU and the data has been processed and, thereafter, the processed signal has been converted into the analog control signal by the D/A converter. However, for instance, the following other various ways are considered for using the result of the process.

Data or signals can be also directly output from the fuzzy inference processing circuit to the outside without using the CPU. For instance, in the case of the control of an apparatus or the like, a control signal can be also directly output from the fuzzy inference processing circuit by using an interface circuit.

It is also possible to construct the system such that the signals are output as data to the terminal apparatus, printer, or the like, thereby enabling the user to read the data or the like. As an output format, there are considered, for instance, a system in which the membership function is directly output as numerical values, a system in which the membership function is displayed as a graph, a system in which the membership function is output as a linguistic expression such as "slightly hot", and the like. The membership function is recorded in a recording medium such as a magnetic tape or the like and can be also used later.

The output of the fuzzy inference processing circuit can be also used as inputs of other fuzzy computers. In this case, it is not always necessary to directly connect the system to other fuzzy computers but the data which has once been recorded on a magnetic disk or the like can be also used as will be explained hereinlater.

The output of the fuzzy inference processing circuit can be also used by the program of the digital computer. For instance, when a robot, a machine, or the like is controlled by the program of the digital computer, by combining the fuzzy inference, the portion which is difficult to be processed by the ordinary program can be supplementarily processed by the fuzzy inference.

On the other hand, by combining with a program to execute the inference such as an AI (Artificial Intelligence), the portion which cannot be unconditionally determined to be YES or NO can be processed by the fuzzy inference.

In the fuzzy inference processing circuit, the fuzzy inference of what is called a modus ponens (If-then rule) is executed. The If-then rule is expressed by the following format.

If $a = A$ and $b = B$, then $c = C$

Consideration will now be made with respect to the case where a and b are given as deterministic values like input signals from the sensors or the like instead of a fuzzy set. As in the case of the MFCs shown in FIG. 3, a circuit to generate a function value (grade) of a membership function A or B (such a function value is referred to as an adaptation of the input a or b to the membership function A or B) when the input a or b is given is called an antecedent processing circuit. The fuzzy inference is executed by applying the result of the process of the antecedent part (the above adaptation or the result of the MIN or MAX operation of a plurality of adaptations) to the membership function C of the consequent part.

Figure 4:
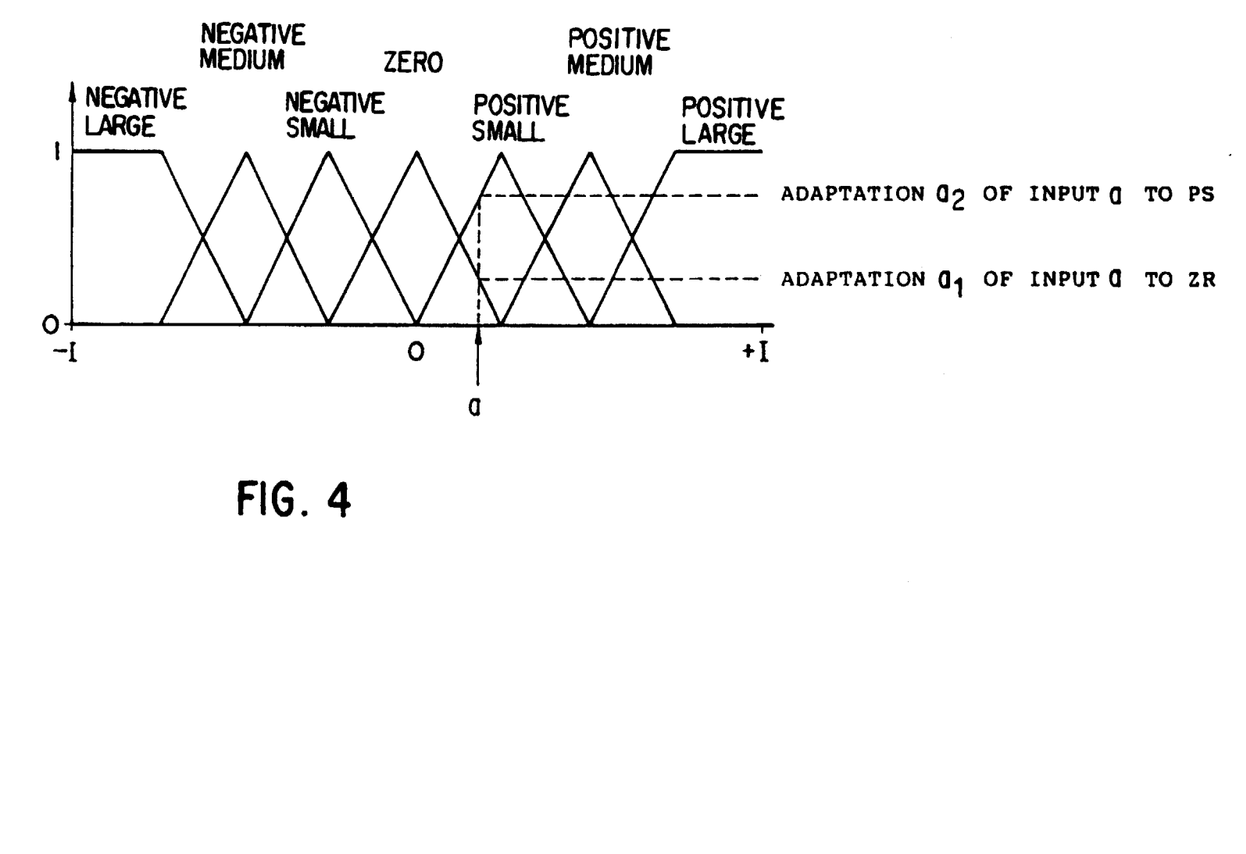
FIG. 4 is a graph showing an example of membership functions.

As shown in FIG. 4, seven kinds of membership functions having an isosceles triangular shape are presumed. NL denotes Negative Large; NM indicates Negative Medium; NS Negative Small; ZR Almost Zero; PS Positive Small; PM Positive Medium; and PL Positive Large, respectively. The input a has a range from $-I$ to $+I$.

If ZR is set as a membership function A in the If-then rule, when the input a is given to the antecedent processing circuit, an adaptation $a_1$ of the input a to the ZR is output from the processing circuit. If PS is set as the membership function A, when the input a is given, an adaptation $a_2$ of the input a to the PS is obtained.

A practical example of the antecedent processing circuit to obtain the adaptation of the input a to the set membership function when the input is given as mentioned above will now be described with reference to FIGS. 5 and 6.

Figure 5:
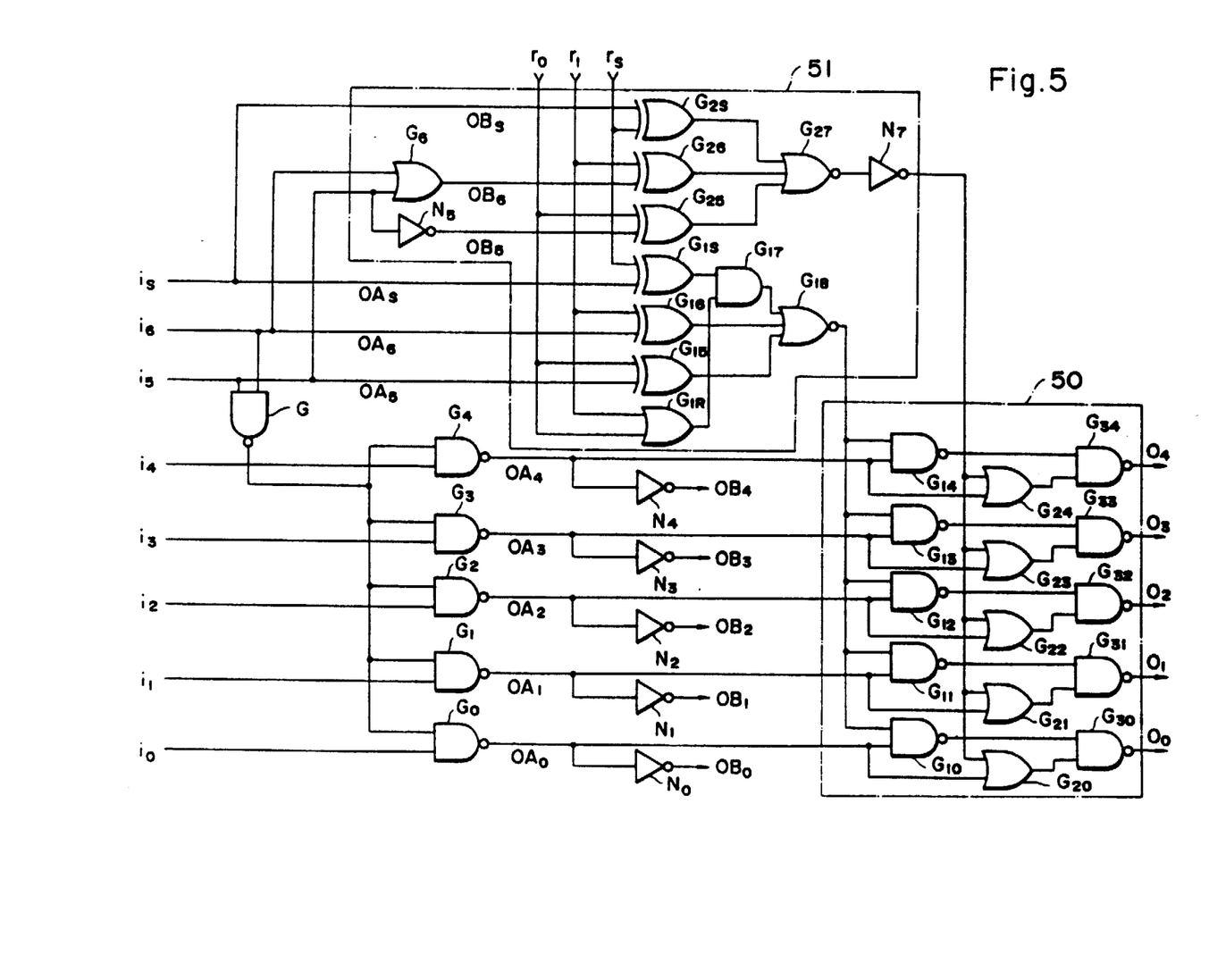
FIG. 5 is a circuit diagram showing a practical example of an antecedent processing circuit.
Figure 6:
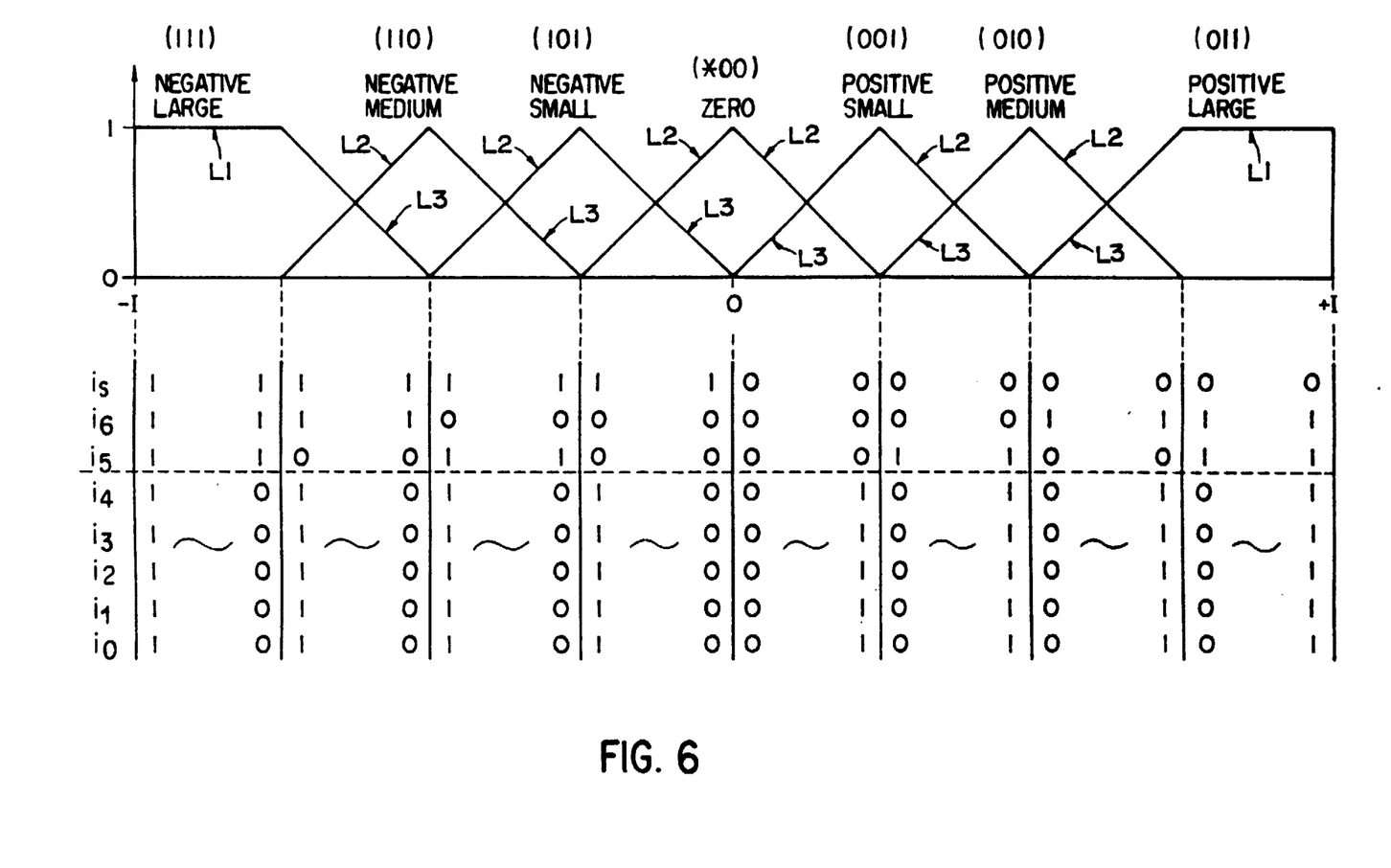
FIG. 6 is a diagram for explaining the operation of the circuit shown in FIG. 5.

FIG. 5 shows the antecedent processing circuit and FIG. 6 is a diagram for explaining the operation of the processing circuit. Different from the MFCs shown in FIG. 3, the input signal a is given as a digital signal to the antecedent processing circuit and an adaptation (output) of the input a to the set membership function is also expressed by a digital value. The input signal a is expressed by eight bits of $i_0, i_1, \ldots, i_6$, and $i_s$. Bit $i_s$ indicates the positive or negative sign of the input a. When $i_s = 1$, the input a is a negative value. When $i_s = 0$, the input a is a positive value. The other seven bits $i_0$ to $i_6$ indicate the absolute value of the input a. $i_6$ is the most significant bit. $i_0$ is the least significant bit. The values of the bits of the input a in an input range from $-I$ to $+I$ are set as shown in the lower portion in FIG. 6. The range from $-I$ to $+I$ is divided into eight areas by three bits $i_5, i_6$, and $i_5$. Each of the eight areas is divided into 32 areas by five bits $i_4, \ldots, i_0$ in each area. The membership functions of NL, NM, ..., PL are shown in the upper portion in FIG. 6.

In the circuit of FIG. 5, the lower bits $i_4, \ldots, i_0$ of the input signal are respectively individually applied to one input terminal of each of NAND circuits $G_4, G_3, \ldots, G_0$. The higher bits $i_6$ and $i_5$ of the input signal are connected to the input terminals of an NAND circuit G. Output terminals of the NAND circuit G are connected to the other input terminals of the NAND circuits $G_4, \ldots, G_0$. Output terminals of the NAND circuits $G_4, \ldots, G_0$ are connected to an adaptation output circuit 50 comprising: NAND circuits $G_{14}, G_{13}, \ldots, G_{10}$, OR circuits $G_{24}, G_{23}, \ldots, G_{20}$, and NAND circuits $G_{34}, G_{33}, \ldots, G_{30}$.

The bits $i_5$ and $i_6$ of the input signal are given to the input terminals of the OR circuit $G_6$. Further, the bit $i_5$ is connected to an inverter $N_5$. The bits $i_5, i_6$, and $i_5$ of the input signal are connected to one input terminal of each of exclusive OR circuits $G_{15}, G_{16}$, and $G_{15}$. Further, the bit $i_5$, output terminals of the OR circuit $G_6$, and output terminals of the inverter $N_5$ are connected to one input terminal of each of exclusive OR circuits $G_{25}, G_{26}$, and $G_{25}$, respectively.

$r_0, r_1$, and $r_5$ denote codes indicative of the kind of the membership function A in the rule which has been set in the antecedent processing circuit. The codes are defined such that NL = 111, NM = 110, NS = 101, ZR = *00 (* may be set to either 0 or 1), PS = 001, PM = 010, and PL = 011. The codes are determined so as to have the intimate relations with the codes comprising the bits $i_5$, $i_6$ and $i_5$ indicative of the input data of the area which is covered by each membership function.

The bit $r_0$ is connected to the other input terminals of the exclusive OR circuits $G_{15}$ and $G_{25}$. The bit $r_1$ is connected to the other input terminals of the exclusive OR circuits $G_{16}$ and $G_{26}$. The bit $r_s$ is connected to the other input terminals of the exclusive OR circuits $G_{1s}$ and $G_{2s}$. The bits $r_0$ and $r_1$ are connected to input terminals of an OR circuit $G_{1R}$. Output terminals of the exclusive OR circuit $G_{1s}$ and output terminals of the OR circuit $G_{1R}$ are connected to input terminals of an AND circuit $G_{17}$. Output terminals of the exclusive OR circuits $G_{15}$ and $G_{16}$ and AND circuit $G_{17}$ are connected to input terminals of an NOR circuit $G_{18}$. Output terminals of the exclusive OR circuits $G_{25}$, $G_{26}$, and $G_{2s}$ are connected to input terminals of an NOR circuit $G_{27}$. Output terminals of the NOR circuit $G_{18}$ are directly connected to the adaptation output circuit 50. Output terminals of the NOR circuit $G_{27}$ are connected to the adaptation output circuit 50 through an inverter $N_7$. A gate control circuit 51 is constructed by the OR circuits, AND circuits, exclusive OR circuits, and NOR circuits which are provided in a range from the OR circuit $G_6$ and inverter $N_5$ to the inverter $N_7$ in FIG. 5 and by the inverters mentioned above. The gate control circuit 51 discriminates whether the input signal a lies within a range which is covered by the membership function A (either one of NL to PL) of the rule which has been set in the antecedent processing circuit or not, thereby controlling the gates (group of NAND circuits) of the adaptation output circuit 50.

In the circuit of the embodiment, if both of the bits $i_6$ and $i_5$ are set to "1", the output of the NAND circuit G is set to "0" and all of the outputs $OA_4, \ldots, OA_0$ of the NAND circuits $G_4, \ldots, G_0$ are set to "1". These outputs corresponds to an $L_1$ portion of the membership function in FIG. 6.

In the cases other than the case where both of the bits $i_6$ and $i_5$ are set to "1", the output of the NAND circuit G is set to "1". Thus, the outputs $OA_4, \ldots, OA_0$ of the NAND circuits $G_4, \ldots, G_0$ result in the bits which are obtained by inverting the input bits $i_4, \ldots, i_0$ This means that, for instance, on the negative side, the bits $i_4, \ldots, i_0$ "11111" to "00000" are inverted to "00000" to "11111". Outputs of the first group comprising the $OA_s$, $OA_6, \ldots, OA_0$ (is, $i_6$, and $i_5$ assume $OA_s$, $OA_6$, and $OA_5$) correspond to an $L_2$ portion of the membership function in FIG. 6.

The bit $i_s$ of the input signal assumes $OB_s$, the output of the OR circuit $G_6$ assumes $OB_6$, and the output of the inverter N assumes $OB_5$. On the other hand, the outputs of inverters $N_4, \ldots, N_0$ assume outputs $OB_4, \ldots, OB_0$. The outputs $OB_5, OB_6, \ldots, OB_0$ construct the outputs of the second group. In this case, the relations between the input bits is, $i_6$, and $i_5$ and the outputs $OB_5$, $OB_6$, and $OB_5$ are as shown in the following table.

| $i_s$ | 1 | 1 | 1 | 1 | 0 | 0 | 0 | 0 |
|---|---|---|---|---|---|---|---|---|
| $i_6$ | 1 | 1 | 0 | 0 | 0 | 0 | 1 | 1 |
| $i_5$ | 1 | 0 | 1 | 0 | 0 | 1 | 0 | 1 |
| $OB_s$ | 1 | 1 | 1 | 1 | 0 | 0 | 0 | 0 |
| $OB_6$ | 1 | 1 | 1 | 0 | 0 | 1 | 1 | 1 |
| $OB_5$ | 0 | 1 | 0 | 1 | 1 | 0 | 1 | 0 |

In the cases other than the case where both of the bits $i_6$ and $i_5$ are set to "0", the output of the NAND circuit G is set to "1", so that the outputs of the NAND circuits $G_4, \ldots, G_0$ become the bits which are obtained by inverting the inputs $i_4, \ldots, i_0$. Therefore, the outputs of the inverters $N_4, \ldots, N_0$, that is, the outputs $OB_4, \ldots$, $OB_0$ indicate the bits $i_4, \ldots, i_0$ of the input signal. This means that, for instance, on the negative side, the bits "11111" to "00000" of $i_4, \ldots, i_0$ are directly output as "11111" to "00000". The second group outputs comprising $OB_s, OB_6, \ldots, OB_0$ correspond to an $L_3$ portion of the membership function in FIG. 6.

When the first group outputs $OA_s$, $OA_6$ and $OA_5$ coincide with the code $r_0$, $r_1$ and $r_s$, the control signal from the NOR circuit $G_{18}$ of the gate control circuit 51 is input to the output circuit 50. Five bits of the outputs $OA_4, \ldots, OA_0$ are directly output, that is, the signals which are derived by inverting the input bits $i_4, \ldots, i_0$ are directly output as signals $0_4, \ldots, 0_0$ indicative of the adaptations from the output circuit 50.

On the other hand, when the second group outputs $OB_s$, $OB_6$ and $OB_5$ coincide with the code $r_1$, $r_0$ and $r_s$, the output signal of the NOR circuit $G_{27}$ of the gate control circuit 51 is input to the output circuit 50 through the inverter $N_7$. Five bits of $OA_4, \ldots, OA_0$ are inverted, that is, the signals which are same as the input bits $i_4, \ldots, i_0$ are directly output as the signals $0_4, \ldots$, $0_0$ indicative of the adaptations from the output circuit 50.

It is now assumed that the bits is, $i_6, \ldots, i_0$ of the input signal are, for instance, "10111110" and that the code $r_0$, $r_1$ and $r_s$ is "101". The code $r_0$, $r_1$ and $r_s$ coincide with "101" of $OA_s$, $OA_6$ and $OA_5$. $OA_4, \ldots$, $OA_0 =$"00001" which are derived by inverting the input bits $i_4, \ldots, i_0$ are generated as the outputs $0_4, \ldots$ , $0_0$ indicative of the adaptations from the output circuit 50. On the other hand, since the second group outputs $OB_s$, $OB_6$ and $OB_5$ are set to "110", this coincides with the case where the code $r_0$, $r_1$ and $r_s$ is "110". The input bits $i_4, \ldots, i_0$ are directly generated as the outputs $OB_4$, $\ldots, OB_0=$"11110" ($0_4, \ldots, 0_0$) indicative of the adaptations from the output circuit 50.

On the other hand, for instance, when the bit code $i_s$, $i_6, \ldots, i_0$ of the input signal is set to "00100001" and the code $r_0$, $r_1$, and $r_s$ is set to "001", the code $r_0$, $r_1$ and $r_s$ coincides with $OA_s$, $OA_6$ and $OA_5=$"001". $OA_4, \ldots$, $OA_0=$"11110" which are obtained by inverting the input bits $i_4, \ldots, i_0$ are output as $0_4, \ldots, 0_0$ indicative of the adaptations from the output circuit 50. On the other hand, since the second group outputs $OB_s$, $OB_6$, and $OB_5$ are set to "010", if the code $r_0$, $r_1$ and $r_s$ is set to "010", the input bits $i_4, \ldots, i_0$ are set to $OB_4, \ldots$, $OB_0=$"00001" and they are directly output as the adaptations $0_4, \ldots, 0_0$ from the output circuit 50.

In the above embodiment, the inverters $N_4, \ldots, N_0$ have been provided for convenience of explanation of the outputs $OB_4, \ldots, OB_0$ and they are actually unnecessary.

In the embodiment, the range of the input signal has been set to a range from $-I$ to $+I$. However, the invention can be also obviously applied to the case of a single polarity (that is, the case where the input signal lies within a range from $-I$ to 0 or from 0 to $+I$). On the other hand, the number input is not limited to 8 ($=1+7$) bits.

Although the membership functions having an isosceles triangular shape have been used as an example, the invention can be also applied to the case where the overlap shapes of the isosceles triangles of the membership functions differ or where the membership functions have a trapezoidal shape. In brief, the invention can be applied to the case where the membership functions are fixed and their gradients represent positive or negative straight lines.

On the other hand, although the embodiment has been realized by the logic circuits, the invention is not limited to such a construction but also incorporates an arrangement which is realized by the software processes in the digital computer.

What is claimed is:

1. A fuzzy computer system comprising:
    a digital processor;
    a digital memory;
    a fuzzy inference processing unit circuit for executing a fuzzy inference operation;
    an interface for said fuzzy inference processing circuit;
    a bus for interconnecting said digital processor, said digital memory and said interface; said bus enabling communications among said digital processor, digital memory and, through said interface, said fuzzy inference processing circuit;
    said digital memory storing programs for execution by said digital processor and inference rules for use by said fuzzy inference processing circuit;
    said fuzzy inference processing circuit executing a fuzzy inference on an input signal supplied thereto and in accordance one or more inference rules applied thereto to produce a fuzzy inference result;
    said digital processor executing programs stored in said memory means and, in accordance therewith, applying to said fuzzy inference processing circuit said input signal and one or more inference rules stored in said digital memory for use by said fuzzy inference processing circuit in executing a fuzzy inference, said digital processor fetching an inference result from said fuzzy inference processing circuit, wherein said fuzzy inference processing circuit includes an antecedent processing means, and said input signal is a multi-bit binary input signal, said antecedent processing means comprising:
    gate control means for comparing predetermined bits of said input signal with a code indicative of a set membership function and for outputting a gate control signal when said input signal lies within a range which is covered by said membership function; and
    adaptation output means for outputting a signal indicative of an adaptation of said input signal to the set membership function by using bits other than said predetermined bits of said multi-bit binary input signal when the gate control signal is output and for outputting a signal indicative of zero when the gate control signal is not output.

2. A system according to claim 1, further comprising means connected to said bus for externally controlling the operation of the system.

3. A system according to claim 1, wherein said input signal is int he form of input data, said system further comprising means connected to said bus for supplying said input data to said digital processor and means connected to said bus for using the result of the inference of the fuzzy inference processing circuit.

4. A system according to claim 1, wherein said adaptation output means supplies different sets of bits, each set of bits being derived from said bits other than said predetermined bits of said multi-bit binary input signal, the set of bits supplied by said adaptation output means being determined by the result of the comparison by the gate control means.

5. A system according to claim 1, wherein said adaptation output means outputs said other bits of said multi-bit binary signal as they are or outputs bits which are obtained by inverting said other bits of said multi-bit binary input signal in accordance with the result of the comparison by said gate control means.

* * * * *